US006077377A

United States Patent [19]
Bentz et al.

[11] Patent Number: 6,077,377
[45] Date of Patent: Jun. 20, 2000

[54] PROCESS FOR PRODUCTION OF TUBES OUT OF COMPOSITE CARDBOARD, DEVICE FOR CARRYING OUT THE PROCESS AND COMPOSITE MATERIAL USED THEREIN

[75] Inventors: Hermann Bentz, Römerberg; Peter Fischer, Hockenheim; Klaus Kössendrup, Schifferstadt, all of Germany

[73] Assignee: Weidenhammer Packugen KG GmbH & Co., Hokenheim, Germany

[21] Appl. No.: 09/117,267

[22] PCT Filed: Jan. 27, 1998

[86] PCT No.: PCT/EP97/00349

§ 371 Date: Jul. 27, 1998

§ 102(e) Date: Jul. 27, 1998

[87] PCT Pub. No.: WO97/27041

PCT Pub. Date: Jul. 31, 1997

[30] Foreign Application Priority Data

Jan. 27, 1996 [DE] Germany ............................ 196 02 892

[51] Int. Cl.[7] ..................................................... B32B 31/26
[52] U.S. Cl. .................. 156/195; 156/273.3; 156/309.9; 156/431; 156/499; 156/380.9; 493/299
[58] Field of Search ..................................... 156/190, 195, 156/273.3, 272.2, 309.9, 380.9, 430, 431, 432, 461, 497, 499; 392/417, 418, 419, 423; 493/299, 301

[56] References Cited

U.S. PATENT DOCUMENTS

| | | | |
|---|---|---|---|
| 3,555,976 | 1/1971 | Carter et al. | 493/301 |
| 3,716,435 | 2/1973 | Jensen et al. | 156/195 |
| 4,156,626 | 5/1979 | Souder | 156/273.3 |
| 4,965,105 | 10/1990 | Ruggeberg et al. | 428/34.2 |
| 5,113,479 | 5/1992 | Anderson et al. | 395/417 |
| 5,840,147 | 11/1998 | Grimm | 156/272.2 |

*Primary Examiner*—Michael W. Ball
*Assistant Examiner*—Michael A Tolin
*Attorney, Agent, or Firm*—Antonelli, Terry, Stout & Kraus, LLP

[57] ABSTRACT

A gas-tight tube out of composite cardboard for cans is formed by welding the polymer coatings of neighboring layers, a linearly-focused halogen light source being employed. A marginal strip of the composite material is heated from the side of the material opposite to that having the polymer coating to be melted and welded. In addition, a layer which absorbs and transforms the halogen light into heat can be provided in the area of the marginal strip on the side thereof on which the halogen light is focused. An apparatus for carrying out the process and suitable composite materials are described.

7 Claims, 3 Drawing Sheets

PROCESS FOR PRODUCTION OF TUBES OUT OF COMPOSITE CARDBOARD, DEVICE FOR CARRYING OUT THE PROCESS AND COMPOSITE MATERIAL USED THEREIN

TECHNICAL FIELD

The invention relates to a method for the manufacture of the shell of gas-tight composite material cans and to an apparatus for performing the method having the features of

BACKGROUND

Composite cardboard containers or cans generally comprise a multilayer composite envelope, sleeve or shell, a base placed on one end of the shell and a cover or lid. In the case of a liquid-tight and aroma-tight construction, a sealing membrane is sealed onto the lid side.

The composition of the composite material is a function of the filling material and the given strength requirements. In the case of a liquid-tight construction, the shell has at least one paper layer, on whose inside is provided a metallic barrier layer, generally an aluminium foil, which is in turn lined with a polymer layer. On said shell is externally provided at least one further, generally thicker cardboard layer, the so-called screening, and on the latter is finally placed a label-forming paper web. These shells are constructed as cores, which are cut to length from a helically, continuously produced laminated tube.

In the manufacture of a core, the composite material passes as an endless web onto a winding mandrel under an angle corresponding to the pitch of the helical package. Along one longitudinal edge of the continuous web, a marginal strip is bonded to the marginal strip below it of the section already located on the winding mandrel. Such a core does not satisfy the increased demands concerning gas tightness. The durability of the composite can also suffer in a humid atmosphere. The reason for this is that the externally and internally positioned longitudinal edge form an open surface of cut, so that diffusion processes can take place through the paper or cardboard layer via the surfaces of cut. The can is neither gas-tight, nor pressure-tight. Moisture diffusing in can lead to the swelling of the paper or cardboard and to delamination.

These diffusion processes can be eliminated by a so-called anaconda seam. In this process the continuous web is wrapped round outwards to a double-layer marginal strip along that longitudinal edge, which is subsequently placed on the inside of the finished core (U.S. Pat. No. 3,716,435, EP 113 160). The opposite, undeformed longitudinal edge is heated, so that the polymer layer melts in a marginal strip. In the case of helical winding by means of a winding device, said heated marginal strip passes onto the outer layer of the double layer on the other longitudinal edge and its inside, heated polymer layer welded to the outer polymer layer on the double layer. On said core is then wound at least one further cardboard layer. This prevents diffusion processes from the inside to the outside or vice versa, because on the inside the shell has no free surface of cut and instead a through, closed polymer layer. The seal or tightness of such a core is then substantially only dependent on the welding seam quality.

Due to the incorporated aluminium film, the in trinsically favourable, because very readily controllable high frequency welding cannot be used for welding the polymer layers. Thus, hitherto exclusively hot air has been used and is transported by means of nozzles to the seam (U.S. Pat. No. 3,716,435, EP 113 160). However, this only permits a very poor, local temperature concentration. On impact with the continuous web, the hot air is also deflected to the side, so that a relatively wide strip is heated. In addition, in the case of helical or spiral winding, the hot air must be blown from below onto the continuous web immediately prior to its passing onto the winding mandrel, so that the migration of heat into neighbouring areas is increased. Consequently the polymer layer melts not only at the desired seam, but also in the marginal area. Finally, the temperature at the seam can only be poorly controlled, so that in certain circumstances the polymer melt melts excessively and migrates and optionally also passes onto the winding mandrel, where it sticks. Similar conditions occur with heating by infrared radiation and once again only an inadequate temperature control is possible. The continuous web also takes up too much heat in an excessively large area and then the welding seam cools too rapidly. As a result of the inadequate heat transfer and its poor control possibility, the web speed is limited and consequently so is the output, i.e. the number of shells which can be manufactured per unit of time. Due to the high heat dispersion and thermal losses, the energy needs are also considerable.

It is also known to join thermoplastics or thermoplastically coated composite materials by focussed thermal radiation, so that a better energy balance is obtained. Thus, it is known in connection with cardboard boxes (U.S. Pat. No. 4,156,626) to subject one of the bottom or lid tabs, which are internally coated with a polymer and placed virtually perpendicularly during transportation, to a light source, whose radiation is focussed in punctiform manner. The radiation focus is oriented. on the polymer layer. A strip of the polymer layer is melted on when conveying past the boxes. Subsequently the bottom or lid tab is placed round the other tab and connected thereto by the molten strip.

SUMMARY OF THE INVENTION

In the case of packages made from a composite material, the cutting edge is covered by a plastic sheet (EP 437 847). The composite material comprises a cardboard or paper layer thermoplastically coated on one side, an aluminium barrier layer and a thermoplastic film on the other side. The thermoplastic film projects over the cutting edge of the composite material and is wrapped round said edge and joined on the opposite side to the composite material. The punctiform focussed IR radiation is oriented on the thermoplastic coating of the composite material, in order to melt the same. After wrapping round the projecting film, the heat is delivered to the latter and seals the latter to the composite material. It is also known to coat the composite material at the point to be heated with a light-absorbing, dark strip. In this method particular significance is attached to the fact that the film and the aluminium layer is not influenced by the radiation source prior to wrapping.

On the basis of a method for the manufacture of the shell of gas-tight, composite material cans, the problem of the invention is to obtain a completely satisfactory, sharply defined welding seam, whilst simultaneously reducing the energy necessary for the welding process.

According to the invention, this problem is solved in that the marginal strip is heated from the side subsequently forming the outside of the core, by means of linearly focussed halogen light running parallel to the longitudinal edge adjacent thereto.

The use of halogen radiators as a heat source for various engineering processes, such as drying, gelling, activation of adhesives, etc. is known per se. However, these radiators are exclusively used as surface radiators and not for plastic welding. In the method according to the invention, it has surprisingly been found that linearly focussed halogen light permits an adequate heating of the polymer layer of a composite material. This provides the possibility of producing from a composite material shells, in which the welding seam between the overlapping longitudinal edges of the core can be made very narrow and a completely satisfactory, tight connection can be produced. The width of the welding seam can be adjusted by corresponding focussing and consequently said seam is very precisely defined. Halogen radiators are known to be extremely inexpensive and the temperature at the radiation impact point can be very easily regulated. The energy consumption is low. As there is scarcely any heat migration in the vicinity of the welding seam, i.e. the latter rapidly cools again, high output efficiencies can be achieved. This is not possible with hot air, because a large amount of energy has to be removed. Due to the fact that the heat action can be very precisely limited to the welding seam, the polymer layer, alongside the seam, is not impaired or damaged. These advantages more particularly result from the fact that the continuous web is irradiated from the outside, i.e. from the paper side. Since, as a rule, recycling paper is used, which consequently has a grey or brown colour, the paper layer acts as a poor heat radiator and poor heat conductor, but as a good heat accumulator. The heat penetrates the paper and passes to the aluminium foil, which as a result of its good conductivity, directly transfers the heat to the polymer layer and melts the latter. The lateral heat propagation is very limited, so that the temperature rapidly drops towards the side and the welding or sealing seam area is closely defined. The storage action of the paper layer is sufficient in order to deliver adequate heat to the polymer layer on closing the seam.

A further improvement to the energy efficiency or saving, whilst simultaneously better concentrating the supplied heat on the welding seam area, is brought about if the continuous web, at least on the side facing the halogen light and at least within the marginal strip to be heated, is provided with a light-absorbing coating. This light-absorbing coating can be applied in a width corresponding to the welding seam width. Thus, there is a further improvement to the conversion of light energy into thermal energy in the region of the welding seam.

Preferably, the light-absorbing coating is a dark, preferably black colour track, which is not prejudicial, because it is subsequently covered by the outer cardboard layer.

The invention also relates to an apparatus for performing the method of the invention for producing cores. Such an apparatus is inventively characterized in that the heating device is a linear halogen light source focussed parallel to the undeformed longitudinal edge and positioned above the incoming continuous web.

With such an apparatus, upstream of the winding mandrel can be provided a device for applying a dark colour track to the top of the incoming continuous web. Instead of this, it is naturally possible during the manufacture of the continuous web to provide the latter with such a colour track.

As is known from the prior art; the apparatus also has at least one device for the subsequent winding of a cardboard web onto the core. As a function of the strength requirements, two or more cardboard webs can be wound onto the outside.

The invention is described in greater detail hereinafter relative to the embodiments and the attached drawings.

DETAILED DESCRIPTION OF DISCLOSED EMBODIMENTS

Figures 1, 2:
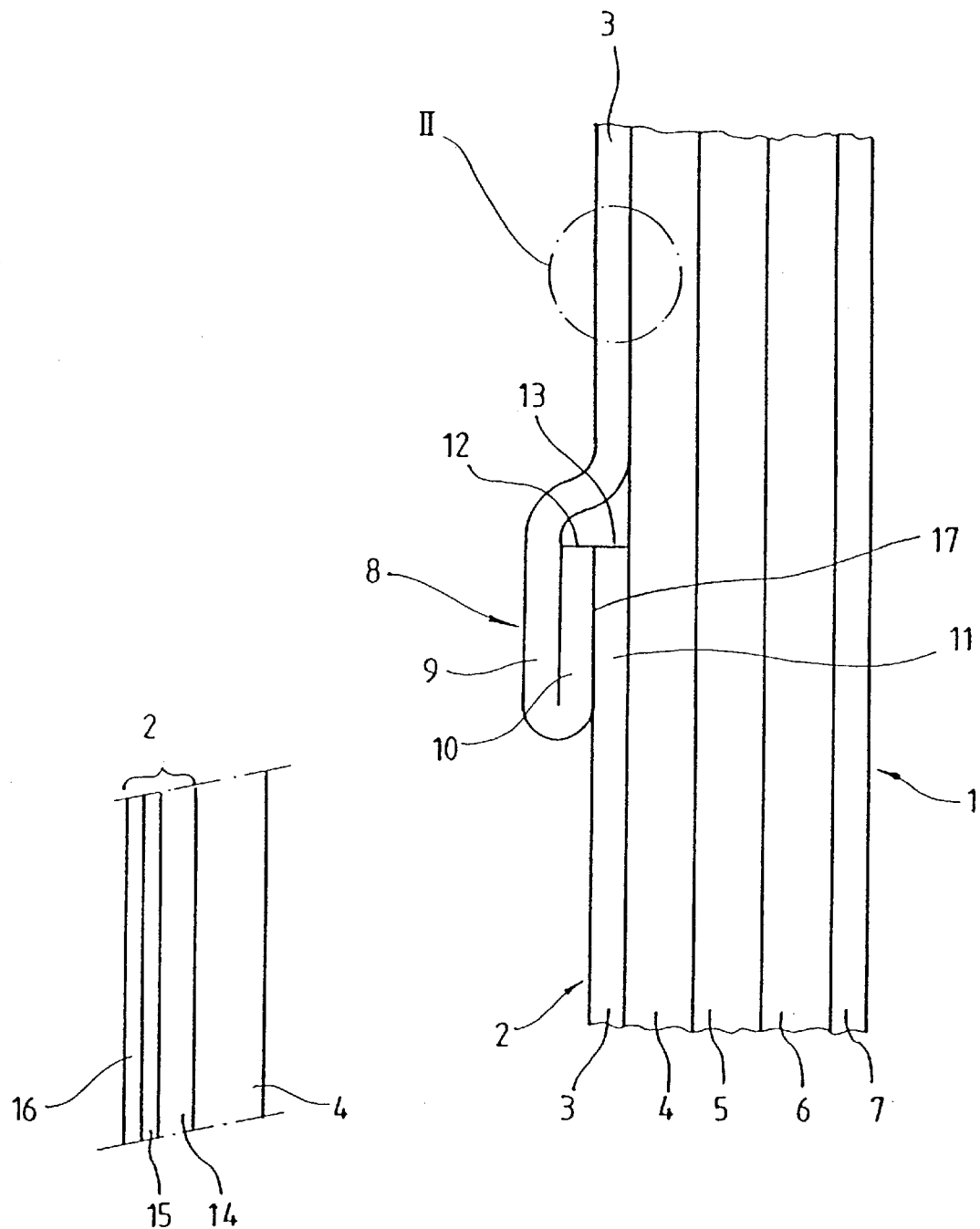
FIG. 1 A longitudinal section through the wall of the shell of a composite cardboard can.
FIG. 2 Detail II of FIG. 1 on a larger scale.

FIG. 1 shows the cross-section of the wall of a shell 1 of a composite cardboard can on a greatly increased scale. The shell can have a circular, oval or more or less rectangular cross-section with rounded corners. Reference is then made to round or non-round cans. The layer structure of the wall of the shell 1 is essentially a function of the nature of the filling material and the requisite stability.

In the embodiment shown in FIG. 1, the shell 1 has, from the inside to the outside, a gas and liquid-tight inner layer 2 and three successive cardboard layers 4, 5, 6, a s well as an outer paper or plastic sheet layer 7, the latter being printed or pirntable and forms a label. The shell 1 according to FIG. 1 is produced by winding from a continuous web, so that e.g. the inner layer 2 comprise s helically juxtaposed webs 3, which overlap in the area 8. One longitudinal edge of the web 3 is wrapped round outwards to the double layer, accompanied by the formation of the inner layer 9 and outer layer 10 and is connected to the undeformed marginal strip 11 of the adjacent layer of the web 3, so that the surfaces of cut 12, 13 of the two layers of the web 3 are covered. In the same way, the cardboard webs 4, 5 and 6 and optionally also the paper web 7 are helically wound on the inner layer 2. In the case of layers 4, 5, 6 and 7, the preservation of the intersection points, as for the inner layer 2, is unnecessary.

As shown in FIG. 2, the inner layer 2 comprises an outer paper layer 14, a metallic layer 15, e.g. an aluminium foil inwardly connected thereto, and an inner polymer, e.g. polypropylene layer 16. When filling foods, said polymer layer 16 fulfils the food hygiene requirements and also ensures, in conjunction with the metallic layer 15, the necessary liquid and gas-tightness. Thus, the web 3 forming the inner layer 2, as described relative to FIG. 1, in the overlap area on one longitudinal edge is wrapped round to the double layer and the there superimposed polymer layers 16 are thermally welded for forming a gas and liquid-tight seam 17.

Figure 3:
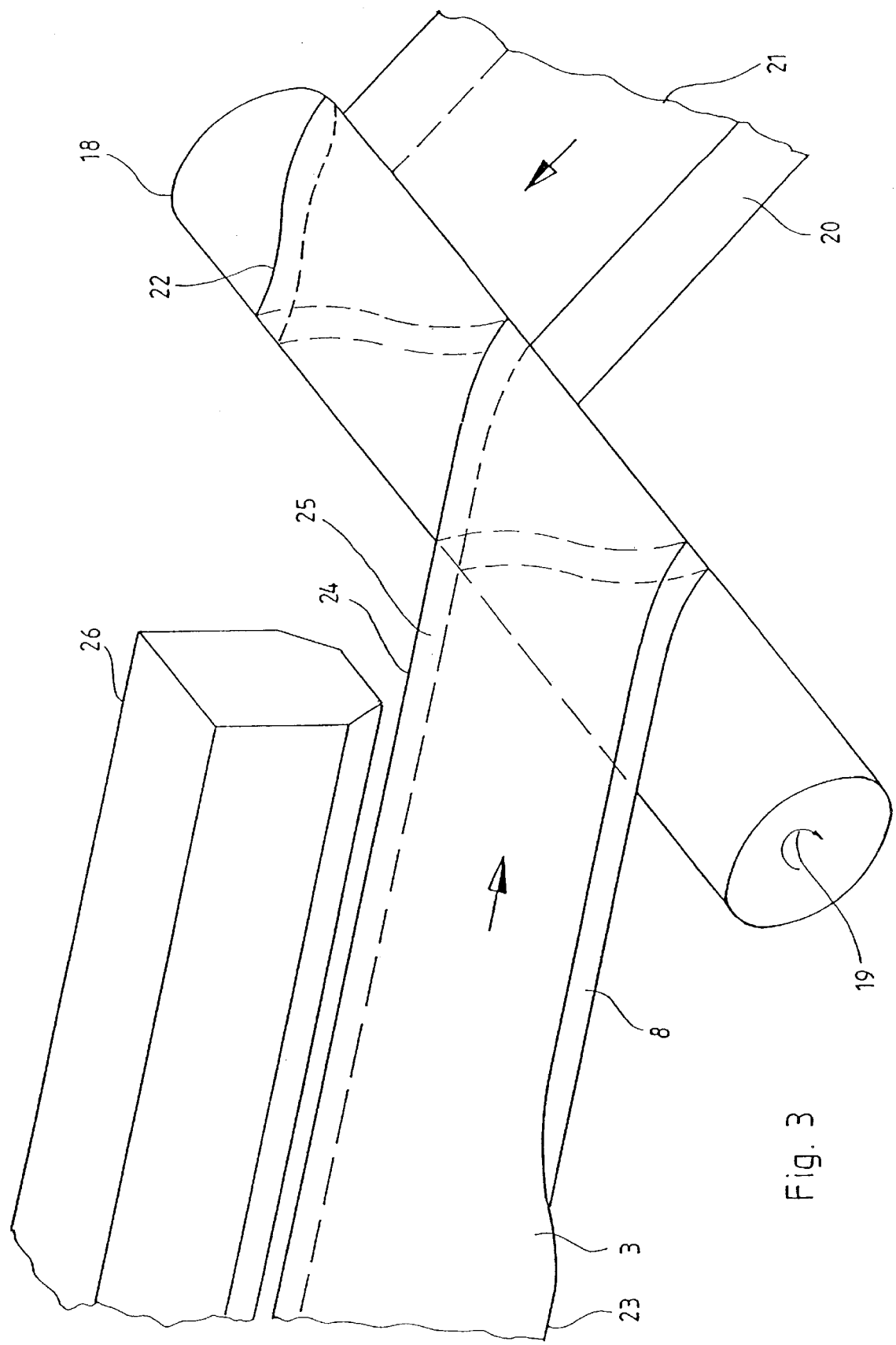
FIG. 3 A diagrammatic, perspective representation of an apparatus for producing a spirally wound shell.

FIG. 3 shows the essential parts of an apparatus for the production of the core 1 according to FIG. 1. The apparatus has a winding mandrel 18. The continuous web 3 forming the inner layer 2 passes from one side of the winding mandrel and is removed from a package stored on a reel. From the other side of the winding mandrel are supplied the continuous webs forming the cardboard layers 4, 5 and 6, as well as the outer paper layer 7, only the two continuous webs 20, 21 being represented. Said continuous webs are supplied in already overlapping manner to the winding mandrel 18. The continuous webs 3, 20, 21, with respect to the axis of the winding mandrel 18, pass in under the pitch angle of the helical core 22 to be produced. The winding technology as such is known (e.g. U.S. Pat. No. 3,716,435), so that there is no need to describe details thereof.

The continuous web 3 forming the inner layer 2 is placed round upwards to the double layer 8 at its longitudinal edge 23 at the front in the drawing, whilst the opposite longitudinal edge 24 remains undeformed. Above said longitudinal edge 24 or a marginal strip 25 connected thereto is provided a halogen radiator 26, whose light radiation is linearly focussed onto the marginal strip 25. This halogen light is converted into heat in the composite material forming the continuous web 3, so that the polymer layer on the bottom melts. It passes on the winding mandrel 18 onto the double layer 8 of the continuous web portion already placed thereon, so that the heated and melted polymer layer is welded on the underside of the marginal strip 25 with the upper polymer layer of the double layer 8 on the opposite longitudinal edge 23. The heat supply is largely limited to the marginal strip 24 and consequently to the welding or sealing seam. The temperature can be very well controlled by using the halogen radiator 26, so that there is also a rapid cooling of the seam during the further winding process. Consequently high web speeds can be achieved when producing the continuous core 22. The shell for the can is then cut from said continuous core.

Figure 4:
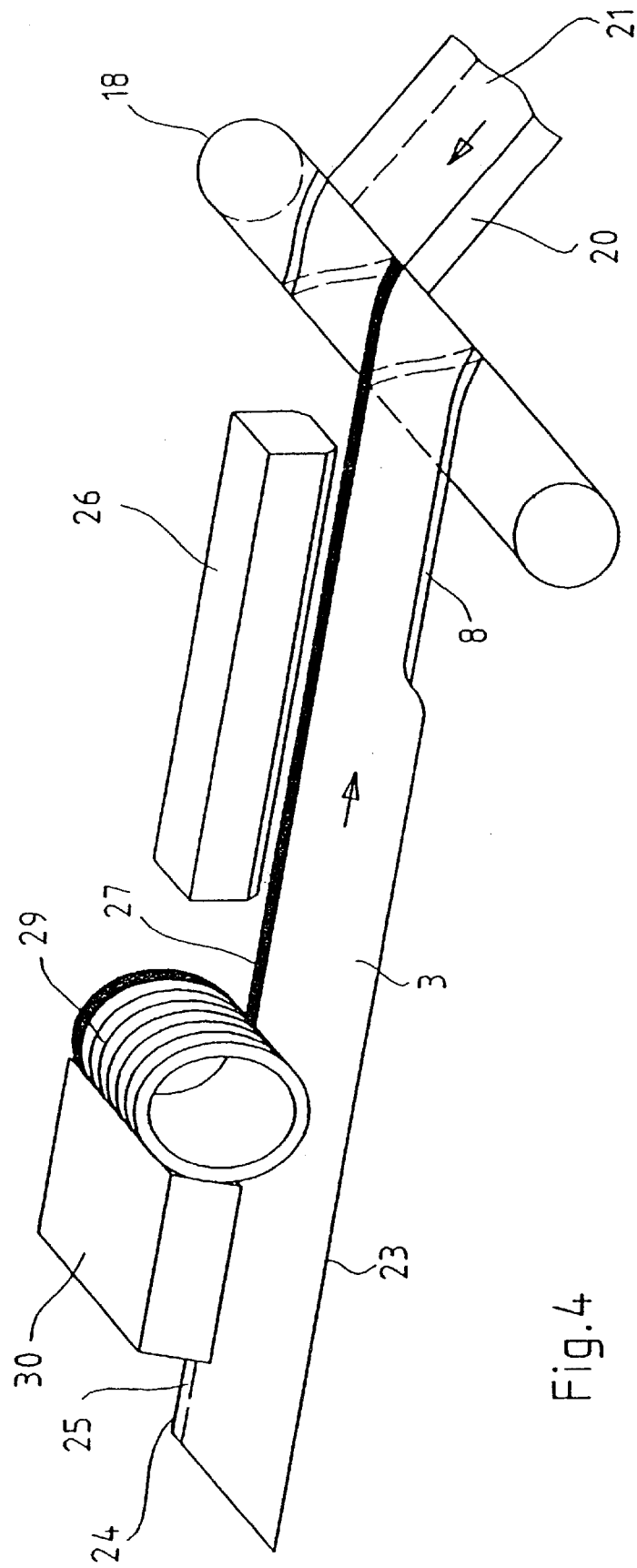
FIG. 4 A diagrammatic representation of a modified embodiment of the apparatus according to FIG. 3.

An improvement to the temperature control and the conversion of the radiation of the halogen radiator 26 into heat can be achieved in that on the top of the marginal strip 25 is applied a dark, e.g. black colour track 27 (FIG. 4), which corresponds roughly to or is narrower than the width of the marginal strip 25. This also aids the concentration of heat on the marginal strip 25. This colour track 27 can be applied by a sprayer positioned upstream of the halogen radiator 26 or a printing unit with printing cylinder 29 and ink duct 30 to the marginal strip 25.

What is claimed is:

1. Method for the manufacture of the shell of gas-tight, composite material cans, having from the outside to the inside at least one paper or cardboard layer, a metallic barrier layer and a polymer layer, facing the filling material and covering said barrier layer, in that a continuous web of the composite material is wrapped round on a longitudinal edge to a double layer marginal strip, the continuous web on a marginal strip is heated along the opposite longitudinal edge, accompanied by the melting of the polymer layer, and subsequently wound helically onto a mandrel for forming a laminated tube, the heated marginal strip running up in overlapping manner onto the outside polymer layer of the double layer marginal strip of a web portion placed on the mandrel and joined thereto by welding together the polymer layers and subsequently at least one further paper or cardboard layer is placed in overlapping manner on the outside and marginally bonded, wherein the marginal strip is heated from the paper or cardboard layer side thereof subsequently forming the outside of the core by means of halogen light linearly focussed parallel to the longitudinal edge adjacent thereto for melting the polymer layer on the opposite, inner side of the composite material of said marginal strip.

2. Method according to claim 1, wherein the continuous web, at least on the side facing the halogen light, at least within the marginal strip to be heated, is provided with a light-absorbing coating.

3. Method according to claim 1, wherein the light-absorbing coating is applied in a width corresponding to the welding seam width.

4. Method according to claim 2, wherein a dark, colored track is applied as the light-absorbing coating.

5. Apparatus for performing the method according to claim 1, said apparatus comprising a winding mandrel to which is supplied an endless composite material web by means of a winding device under the pitch angle of the helical core, a device positioned upstream of the winding mandrel for wrapping round the continuous web to a double layer marginal strip along the longitudinal edge facing the winding mandrel and a heating device upstream of the point at which the continuous web runs up onto the winding mandrel for melting the polymer layer on a marginal strip along the facing, undeformed longitudinal edge of the continuous web, wherein the heating device is a linear halogen light source focussed parallel to the undeformed longitudinal edge, which is placed above the incoming continuous web for melting the polymer layer on the opposite, bottom side of the marginal strip of the incoming continuous web.

6. Apparatus according to claim 5, wherein upstream of the winding mandrel is provided a device for applying a light-absorbing coating, to the top of the incoming continuous web.

7. Apparatus according to claim 6, wherein the device is a sprayer or printing unit.

* * * * *

UNITED STATES PATENT AND TRADEMARK OFFICE
CERTIFICATE OF CORRECTION

PATENT NO. : 6,077,377
DATED : June 20, 2000
INVENTOR(S) : Hermann Bentz et al.

It is certified that error appears in the above-identified patent and that said Letters Patent is hereby corrected as shown below:

Title page,
Item [22], PCT Filed - replace "Jan. 27, 1998" with -- Jan. 27, 1997 --.

Signed and Sealed this

Eighteenth Day of September, 2001

Attest:

*Nicholas P. Godici*

NICHOLAS P. GODICI
*Attesting Officer*  *Acting Director of the United States Patent and Trademark Office*